Patented Jan. 8, 1935

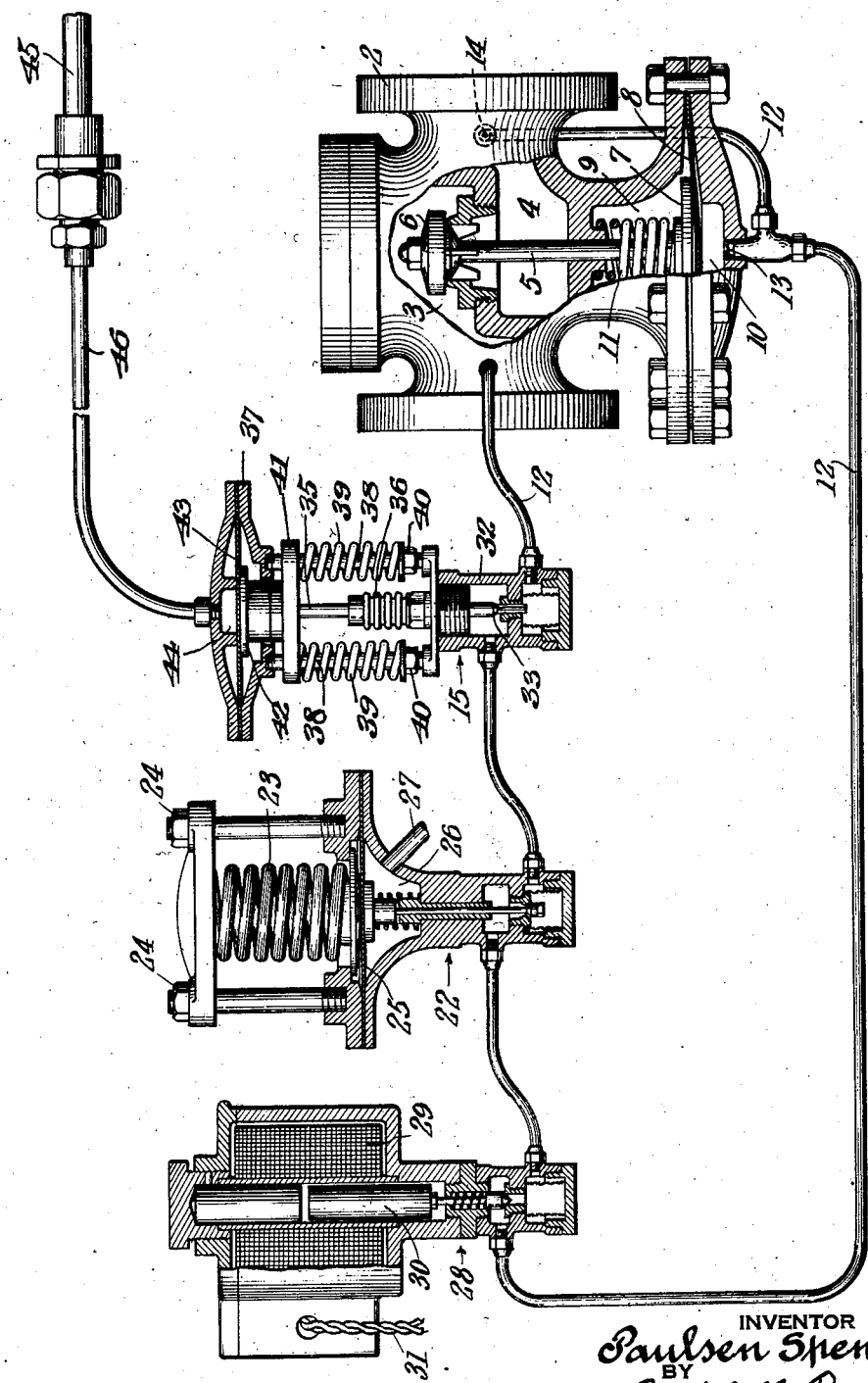

1,987,032

UNITED STATES PATENT OFFICE 1,987,032

AUTOMATIC REGULATING VALVE

Paulsen Spence, East Orange, N. J.

Application May 8, 1931, Serial No. 535,876

1 Claim. (Cl. 236—80)

My invention relates to an automatic regulating valve, and more particularly, to a combined temperature and pressure regulator. This application contains subject matter which has already been disclosed in my co-pending application Serial No. 366,837 filed May 29th, 1929, and subject matter which has already been disclosed but not claimed in my co-pending application Serial No. 63,920, filed October 21, 1925.

It is an object of the present invention to provide a regulating valve for the automatic control of the pressure fluid supply to an apparatus so as to maintain therein either a constant, adjustable, and predetermined temperature, or a constant, adjustable, and predetermined pressure, without exceeding a predetermined limit for the other one of these characteristics. Such a valve is very useful when used for controlling the flow of pressure fluid to a hot water heater, pressure cooker, or similar apparatus. Such dual control has been obtained in the past by the use of separate main valves, one of them being controlled by pressure and the other being controlled by temperature. In my invention but one main valve is used, with the result that the first cost and also the maintenance charges are reduced.

It is a further object of my invention to provide a regulating valve which is actuated by fluid pressure and which has a plurality of independently operated pilot valves connected in series for controlling the fluid pressure which actuates the regulating valve.

It is a further object of my invention to provide a regulating valve which is actuated by fluid pressure and which has an automatic thermostatic pilot valve for controlling the fluid pressure which actuates the regulating valve.

It is a further object of my invention to provide a regulating valve which is actuated by fluid pressure and which has a solenoid operated pilot valve for controlling the fluid pressure which actuates the regulating valve.

Other objects and features of the invention will be pointed out or will become apparent upon reading the specification.

In the drawing which shows, for illustrative purposes only, a preferred form of the invention:

The figure is a central sectional view of a regulating valve embodying features of my invention, parts being shown in elevation.

In the drawing, 2 represents the body of a main valve preferably of the type disclosed in my co-pending application Serial No. 366,837 filed May 29, 1929. The body 2 has an inlet chamber 3 and an outlet chamber 4. 5 represents a valve stem and 6 is a valve head attached to the stem. Coacting with a disk 7 attached to the valve stem 5 is a flexible diaphragm 8. The diaphragm is contained in a diaphragm chamber which may be integral with the body 2. The diaphragm divides the diaphragm chamber into two chambers 9 and 10 which, for convenience, I shall term the upper and lower diaphragm chambers respectively. A light spring 11 may be placed preferably in one of the diaphragm chambers for the purpose of taking up slack. Communication is provided between the outlet chamber 4 and the diaphragm chamber 9 by loosely fitting the valve stem 5 in the body 2 so that the fluid in the outlet chamber 4 will leak past the valve stem 5 into the diaphragm chamber 9. The outlet side of the main valve is connected by means (not shown) to a heating apparatus or heating element (not shown), for example, to a hot water heater.

12 is a control pipe which may lead from the inlet chamber 3 to the diaphragm chamber 10 and may also lead to the outlet chamber 4. The pipe 12 may open into the diaphragm chamber 10 through a restricted orifice 13 and may open into the outlet chamber 4 through a restricted orifice 14.

Interposed in the control pipe 12 is one or more pilot valves. 15 represents a thermostatic pilot valve having a body 32 which has inlet and outlet chambers therein. 33 represents a valve head for controlling the passage of fluid between said inlet and outlet chambers. 34 is a hood secured to the body 32. This hood has a passage therethrough through which passes a valve stem 35 which is attached to the valve head 33. Leakage of fluid between the valve stem 35 and the hood 34 is prevented by means of a stuffing-box in the hood 34, or by means of a flexible tubular bellows 36 which connects the hood 34 and the valve stem 35. 37 is a diaphragm casing which is secured to the hood 34 by means of the bolts 38—38. 39—39 are spiral springs surrounding the bolts 38—38 and carried by adjusting nuts 40—40 which are threaded on the bolts 38—38. 41 is a yoke which is carried by the springs 39—39 and which coacts with the valve stem 35 so as to actuate said valve stem. 42 is a disk which is carried by the yoke 41 and which coacts with a diaphragm 43 within the diaphragm casing 37. The diaphragm 43 and the diaphragm casing 37 together form a diaphragm chamber 44. 45 is a thermostat bulb to be inserted in the chamber or fluid the temperature of which is to be regulated. The bulb 45 is connected to the diaphragm chamber 44 by means of a pipe 46. The diaphragm chamber 44, the bulb 45, and the pipe 46, together form a closed container in which is placed a quantity of a vapor tension element which will expand as its temperature is increased.

I may also interpose in the control pipe 12 a pressure controlled pilot valve such as shown at 22. This valve has a spring 23 which tends to hold the valve open and the tension of which may be adjusted by means of the nuts 24—24. This valve has a diaphragm 25 and a diaphragm chamber 26. 27 is a pipe which connects the interior of the heating apparatus or element which is supplied by the main valve with the diaphragm chamber 26.

I may also interpose in the control pipe 12 a solenoid operated valve such as shown at 28. 29 is the coil of the solenoid and 30 is a soft iron core which operates the valve. 31 represents the two wires of the electric circuit leading to the coil of the solenoid. This circuit may contain a hand operated switch for the remote control of the main valve, or it may contain a thermostatic switch or a pressure operated switch for the automatic control of the main valve.

When the apparatus with which the regulating valve is used is to operate at a constant pressure and it is desired to protect it against excessive temperature, a pressure controlled pilot valve such as shown at 22 is placed in the control pipe 12, and excessive temperature is prevented by interposing in the control pipe 12 a pilot valve such as shown at 15 or at 28. If a solenoid operated pilot valve such as shown at 28 is used to protect against excessive temperature, the pilot valve is controlled by a thermostatic switch (not shown) which is inserted in the electric circuit.

When the apparatus with which the valve is used is to operate at a constant temperature and it is desired to protect it against excessive pressure, a temperature controlled pilot valve such as shown at 15 is placed in the control pipe 12, and excessive pressure is prevented by interposing in the control pipe 12 a pilot valve such as shown at 22 or 28. If a solenoid operated pilot valve such as shown at 28 is used to protect against excessive pressure the pilot valve is controlled by a pressure operated switch (not shown) which is inserted in the electric circuit.

Let us suppose that the regulating valve is to be connected to a high pressure steam supply and that the outlet side of the valve is to be connected to a hot water heater, and that it is desired to maintain the hot water therein at a temperaure of 100° F. and to protect the hot water heater against a pressure in excess of 25 lbs. per square inch. In such case a thermostatic pilot valve such as 15 will be interposed in the control pipe 12. The thermostatic bulb 45 will be inserted in the hot water heater so as to contact with the water therein. The tension of the springs 39—39 will be adjusted by means of the adjusting nuts 40—40 so that the pilot valve 15 will close when the vapor tension in the diaphragm chamber 44 is the tension corresponding to a temperature of 100° F. in the hot water heater. A second pilot valve will be interposed in the control pipe 12 so as to operate to close the control pipe when the pressure in the hot water heater reaches 25 lbs. per square inch. This second pilot valve may be of the solenoid operated type such as shown at 28 or of the pressure operated type such as shown at 22. If a solenoid operated valve such as shown at 28 is used, a pressure operated switch will be connected to the circuit 31 and will be located at the hot water heater so as to be operated by the pressure in the hot water heater. If a pilot valve such as shown at 22 is used, the pipe 27 which opens into the diaphragm chamber 26 will be connected so as to open into the interior of the hot water heater. If a hand operated remote control of the regulating valve is desired, a third pilot valve, preferably of the solenoid operated type such as shown at 28, will be interposed in the control pipe 12.

The operation of the device is as follows:

Let us assume that there have been interposed in the control pipe 12 a thermostatic pilot valve 15, a pressure operated pilot valve 22, and a remote control pilot valve 28. These three valves are so arranged that all of them will normally be open when the hot water heater is in use. When all three of these valves remain open, high pressure fluid from the inlet chamber 3 will pass through the control pipe 12 into the diaphragm chamber 10 and will act upon the diaphragm 8 so as to hold the main valve open. When the temperature of the water in the hot water heater reaches 100° F. the thermostatic pilot valve 15 will partially close. Thereafter, due to the escape of fluid from the diaphragm chamber 10 to the outlet chamber 4 through the orifices 13 and 14, the pressure in the diaphragm chamber 10 will be gradually reduced until the pressure in the chamber 9 together with the tension of the spring 11 will operate to partially close the main valve. Thereafter if the temperature of the water in the hot water heater drops below 100° F. causing a reduction in the vapor tension in the diaphragm chamber 44, the tension of the springs 39—39 will move the diaphragm 43 against the pressure in the diaphragm chamber 44, and will cause the pilot valve 15 to open wider. This will cause the pressure in the diaphragm chamber 10 to build up and to act upon the diaphragm 9 to cause the main valve to open wider.

Whenever the pressure in the hot water heater exceeds 25 lbs. absolute the pilot valve 22 will close. This will cut off the high pressure fluid to the diaphragm chamber 10. Thereafter, due to the escape of fluid from the diaphragm chamber 10 to the outlet chamber 4 through the orifices 13 and 14, the pressure in the diaphragm chamber 10 will be reduced until the pressure in the chamber 9 together with the tension of the spring 11 will operate to close the main valve.

When a remote control switch is thrown to close the solenoid operated pilot valve 28, the supply of high pressure fluid to the diaphragm chamber 10 will be cut off. The pressure in the diaphragm chamber 10 will be gradually reduced by the escape of fluid through the orifices 13 and 14 until the pressure in the chamber 9 together with the tension of the spring 11 will operate to close the main valve.

It will thus be seen that I have produced a regulating valve which will control the flow of fluid to a heating or cooling element so as to maintain a constant, adjustable, and predetermined temperature, and at the same time protect the element against excessive pressure, or which, if desired, will maintain a constant, adjustable, and predetermined pressure and will at the same time protect the element against excessive temperature. I have accomplished this result with the use of but a single main valve, thus achieving simplicity, low cost, and economy of operation.

I claim:

In a regulating valve, a main valve casing, a main valve head therein for controlling the flow of pressure fluid through said valve casing, a pressure fluid actuated means for moving said valve head to open position, a loading means for moving said valve head to closed position, a connection from the high pressure side of said valve casing to the high pressure side of said fluid pressure actuated means to convey high pressure fluid to the latter for opening said valve, bleed means for bleeding high pressure fluid from the high pressure side of said fluid pressure actuated means to the low pressure side of said main valve, a pair of pilot valves in series in said connection from the high pressure side of said main valve, loading means for normally holding both said pilot valves in open position, pressure means for closing one of said pilot valves, and thermostatic means for closing the other of said pilot valves.

PAULSEN SPENCE.